US010479603B2

(12) United States Patent
Hoang et al.

(10) Patent No.: US 10,479,603 B2
(45) Date of Patent: Nov. 19, 2019

(54) CONTROL SYSTEM

(71) Applicant: Kabushiki Kaisha Toshiba, Minato-ku (JP)

(72) Inventors: Le Anh Hoang, Yokohama (JP); Yasutaka Koga, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 11 days.

(21) Appl. No.: 15/876,501

(22) Filed: Jan. 22, 2018

(65) Prior Publication Data

US 2018/0141753 A1    May 24, 2018

Related U.S. Application Data

(63) Continuation of application No. PCT/JP2017/019570, filed on May 25, 2017.

(30) Foreign Application Priority Data

Jun. 28, 2016   (JP) .................................. 2016-128118
Sep. 12, 2016   (JP) .................................. 2016-177479

(51) Int. Cl.
*B65G 1/137*    (2006.01)
*G06Q 10/08*    (2012.01)
(Continued)

(52) U.S. Cl.
CPC ............... *B65G 1/137* (2013.01); *G01S 1/08* (2013.01); *G01S 5/04* (2013.01);
(Continued)

(58) Field of Classification Search
CPC .. B65G 1/137; G01S 1/08; G01S 5/04; G06K 19/07749; G06Q 10/08; G05B 15/02
See application file for complete search history.

(56) References Cited

U.S. PATENT DOCUMENTS 6,040,774 A  *  3/2000  Schepps .................. G01S 13/74
                                                              340/12.54
6,512,478 B1 *  1/2003  Chien ..................... G01S 5/0215
                                                              340/572.1
(Continued)

FOREIGN PATENT DOCUMENTS

JP         2009-515236         4/2009
JP         2011-219229         11/2011
(Continued)

OTHER PUBLICATIONS

International Search Report dated Jul. 18, 2017 in PCT/JP2017/019570, filed on May 25, 2017 (with English Translation).
(Continued)

*Primary Examiner* — Joseph H Feild
*Assistant Examiner* — Rufus C Point
(74) *Attorney, Agent, or Firm* — Oblon, McClelland, Maier & Neustadt, L.L.P.

(57) ABSTRACT

A control system of an article according to an embodiment includes a first transmitter having a first radio signal range, being mounted at a first location, and transmitting first position information relating to the first location, a second transmitter having a second radio signal range, being mounted at a second location, and transmitting second position information relating to the second location, the second radio signal range being narrower than the first radio signal range, an acquirer acquiring the first position information and the second position information, and a memory part, information relating to the article is associated with the first position information or the second position information and stored in the memory part.

7 Claims, 11 Drawing Sheets

(51) Int. Cl.
    *G01S 1/08*          (2006.01)
    *G01S 5/04*          (2006.01)
    *G06K 19/077*     (2006.01)
    *G05B 15/02*       (2006.01)

(52) U.S. Cl.
    CPC ....... *G06K 19/07749* (2013.01); *G06Q 10/08* (2013.01); *G05B 15/02* (2013.01)

(56) References Cited

U.S. PATENT DOCUMENTS

| | | | | |
|---|---|---|---|---|
| 6,924,741 | B2* | 8/2005 | Tamayama | G08B 7/066 340/572.1 |
| 7,605,702 | B2* | 10/2009 | Uchimura | G01S 5/16 235/385 |
| 8,742,897 | B2* | 6/2014 | Jackson | G06K 19/07749 340/10.1 |
| 8,786,495 | B2* | 7/2014 | Wisherd | G01S 5/0221 342/465 |
| 8,857,725 | B2* | 10/2014 | Wilkinson | G06K 7/10178 235/451 |
| 9,204,251 | B1* | 12/2015 | Mendelson | G08G 1/14 |
| 9,472,075 | B1* | 10/2016 | Simon | G08B 13/2462 |
| 9,491,584 | B1* | 11/2016 | Mendelson | G08G 1/14 |
| 2002/0007292 | A1* | 1/2002 | Paxton | G06Q 10/02 705/6 |
| 2003/0001755 | A1* | 1/2003 | Tiernay | G07B 15/063 340/928 |
| 2004/0021566 | A1* | 2/2004 | Hayashi | F41G 3/2633 340/539.13 |
| 2004/0051644 | A1* | 3/2004 | Tamayama | G08B 7/066 340/686.1 |
| 2005/0093701 | A1* | 5/2005 | Hollon | G06K 19/04 340/572.8 |
| 2006/0053447 | A1 | 3/2006 | Krzyzanowski et al. | |
| 2006/0232412 | A1* | 10/2006 | Tabacman | G06K 7/10861 340/572.1 |
| 2006/0253416 | A1* | 11/2006 | Takatsu | H04L 67/18 |
| 2006/0255919 | A1* | 11/2006 | Doi | G01S 5/18 340/10.51 |
| 2007/0198174 | A1* | 8/2007 | Williams | G06Q 10/047 705/1.1 |
| 2007/0257776 | A1* | 11/2007 | Kim | G06K 7/0008 340/10.2 |
| 2008/0143482 | A1* | 6/2008 | Shoarinejad | G01S 7/003 340/10.1 |
| 2008/0278324 | A1 | 11/2008 | Uchimura et al. | |
| 2010/0205000 | A1* | 8/2010 | Cho | H04W 4/029 705/2 |
| 2010/0214060 | A1* | 8/2010 | Twitchell, Jr. | B65D 88/121 340/5.7 |
| 2010/0214074 | A1* | 8/2010 | Twitchell, Jr. | G06Q 10/08 340/10.3 |
| 2013/0127596 | A1* | 5/2013 | Jain | G01S 13/74 340/10.1 |
| 2015/0206096 | A1* | 7/2015 | Fernandez | G06Q 10/087 705/28 |
| 2016/0337812 | A1* | 11/2016 | Nakagawa | H04W 4/029 |
| 2017/0019769 | A1* | 1/2017 | Li | G01S 1/08 |

FOREIGN PATENT DOCUMENTS

| | | |
|---|---|---|
| JP | 2016-62226 | 4/2016 |
| WO | WO 2006/001237 A1 | 1/2006 |

OTHER PUBLICATIONS

Written Opinion dated Jul. 18, 2017 in PCT/JP2017/019570, filed on May 25, 2017.

* cited by examiner

ACTUAL ARTICLE CONTROL SYSTEM

QUICKSEARCH [         ] [GO] Showall

○ KANBAN NUMBER  ○ ORDER NUMBER  ○ ABBREVIATED NUMBER  ○ DRAWING NUMBER  ○ LOCATION

| KANBAN NUMBER | LOCATION | PERSONNEL | RECEIVED DATE/TIME | ORDER NUMBER | PRODUCT NAME | ABBREVIATED NUMBER | DRAWING NUMBER | QUANTITY | INCOMING CHECK DATE/TIME | DISPATCHED DATE/TIME |
|---|---|---|---|---|---|---|---|---|---|---|
| 10141 | 42:B1 | Hisaki | 2016-02-24 11:07:11.0 | AB1111 | AB-XYZ | GH1234 | Z1234567A | 1 | 2016-02-24 12:43:52 | |
| 10113 | 42:B1 | Hisaki | 2016-02-24 11:07:17.0 | BB12121 | CDE | GH1222 | Z1334567A | 2 | 2016-02-03 10:46:13 | 2016-02-24 11:08:03.0 |
| 21212 | 42:FB | Hisaki | 2016-02-25 18:53:29.0 | AB22222 | AB-XYZ | GH1334 | Z1335567A | 0 | 2016-02-10 09:59:45 | |
| 10010 | 42:F8 | Hisaki | 2016-02-25 18:54:17.0 | AA23232 | CDE | GH1444 | Z1335577A | 30 | 2016-02-18 08:45:12 | |
| 10011 | 42:F7 | Hisaki | 2016-02-25 18:54:17.0 | AA33333 | CDE | GH1555 | Z1234567B | 30 | 2016-02-18 08:45:28 | |
| 10059 | 42:FB | Hisaki | 2016-02-25 18:54:17.0 | AB43434 | CDE | GH1454 | Z1234777B | 30 | 2016-02-03 10:37:13 | |

Page [◀◀] [◀] [1] [▶] [▶▶] of 1
Records 1 to 8 of 8

CONTROL SYSTEM

CROSS-REFERENCE TO RELATED APPLICATIONS

This is a continuation application of International Application PCT/JP2017/019570, filed on May 25, 2017. This application also claims priority to Japanese Application No. 2016-128118, filed on Jun. 28, 2016 and Japanese Application No. 2016-177479, filed on Sep. 12, 2016. The entire contents of each are incorporated herein by reference.

FIELD

Embodiments described herein relate generally to a control system.

BACKGROUND

Barcodes, RFIDs (Radio Frequency IDentifiers), etc., are used conventionally to control the position information of articles in a warehouse, etc. For example, there is a method in which a barcode mounted to a shelf on which an article is stored is read to refer to the position information of the shelf corresponding to the identification information of the barcode; and the position information is used as the storage location of the article.

However, this method cannot be used for a rack-less placement zone, etc., in which the location where the article is stored is not suited to mounting a barcode or a RFID. Accordingly, in such a case, it is necessary for the worker to input the storage location of the article manually, reducing the operational efficiency.

BRIEF DESCRIPTION OF THE DRAWINGS

FIG. 8 and FIG. 9 are schematic views illustrating examples of screens displayed on another displayer;

DETAILED DESCRIPTION

Figure 1:
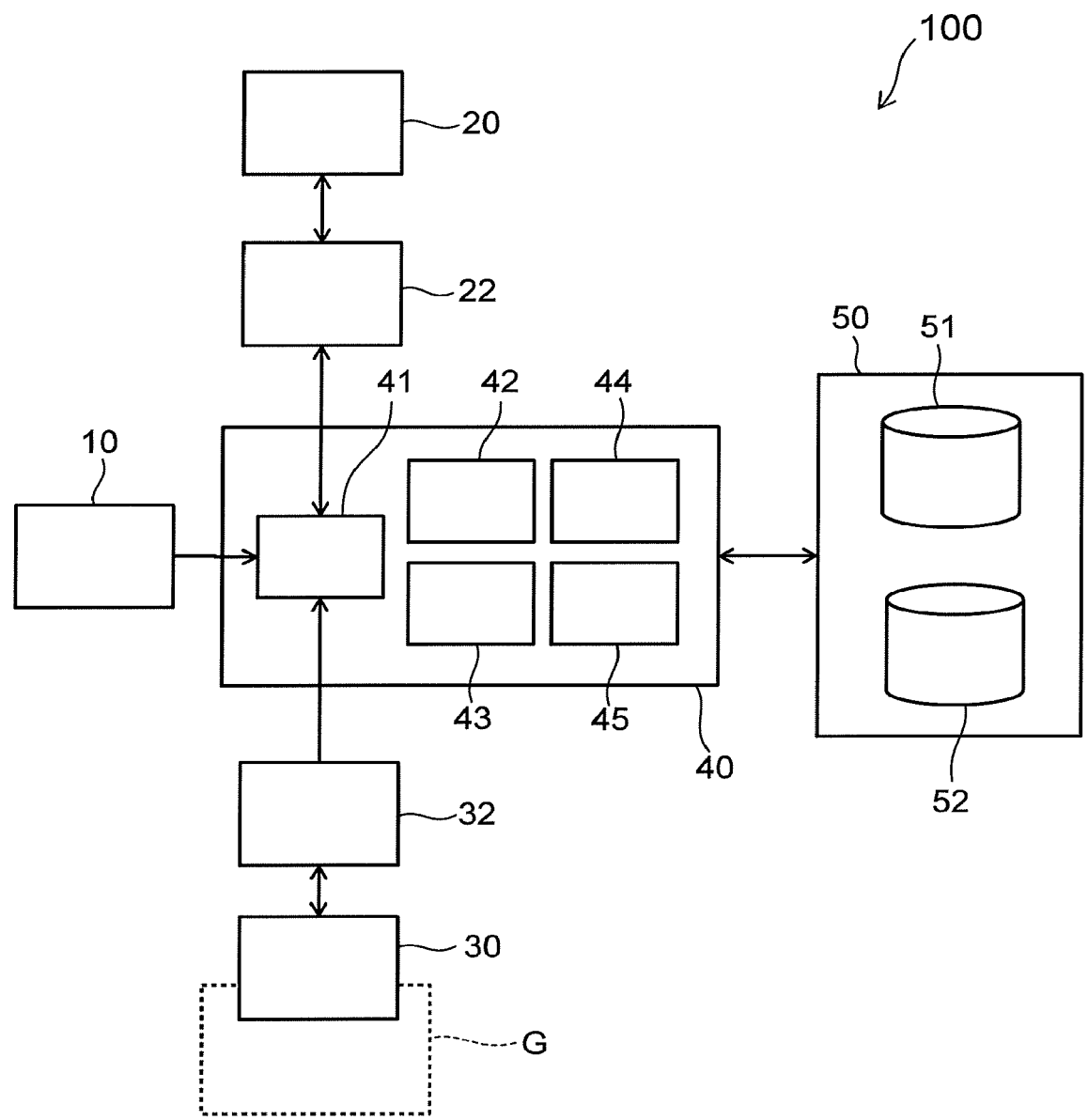
FIG. 1 is a block diagram illustrating the configuration of a control system according to the embodiment.

A control system of an article according to an embodiment includes a first transmitter having a first radio signal range, being mounted at a first location, and transmitting first position information relating to the first location, a second transmitter having a second radio signal range, being mounted at a second location, and transmitting second position information relating to the second location, the second radio signal range being narrower than the first radio signal range, an acquirer acquiring the first position information and the second position information, and a memory part, information relating to the article is associated with the first position information or the second position information and stored in the memory part.

Embodiments of the invention will now be described with reference to the drawings.

In the drawings and the specification of the application, components similar to those described thereinabove are marked with like reference numerals, and a detailed description is omitted as appropriate.

FIG. 1 is a block diagram illustrating the configuration of a control system 100 according to the embodiment.

For example, the control system 100 is used to control articles stored inside a warehouse.

As illustrated in FIG. 1, the control system 100 includes a beacon 10 (a first transmitter), a position tag 20 (a second transmitter), a position tag reader 22 (a first reader), an article tag 30 (a first identifier), an article tag reader 32 (a second reader), a terminal 40 (an acquirer), and a memory part 50.

The beacon 10 is mounted inside the warehouse. The beacon 10 regularly transmits a radio signal containing information relating to the location where the beacon 10 is mounted. For example, iBeacon (registered trademark) can be used as the beacon 10.

The position tag 20 is mounted inside the warehouse similarly to the beacon 10. The position tag 20 transmits a radio signal containing information of the position where the position tag 20 is mounted. The range of the radio signal transmitted from the position tag 20 is narrower than the range of the radio signal transmitted from the beacon 10. The position tag 20 is, for example, a passive RFID tag. A semi-passive or active RFID may be used as the position tag 20.

The position tag reader 22 reads the signal transmitted from the position tag 20. For example, when the position tag 20 is a RFID tag, the position tag reader 22 is a RFID reader. The position tag reader 22 performs wireless transmission of the read position information of the position tag 20 toward the terminal 40.

The article tag 30 is attached to an article G transferred into and stored inside the warehouse. The article tag 30 is, for example, a RFID tag, a barcode, a two-dimensional barcode, etc. The article tag 30 carries unique identification information.

The article tag reader 32 reads the identification information of the article tag 30. For example, if the article tag 30 is a barcode, the article tag reader 32 is a barcode reader. The article tag reader 32 performs wireless transmission toward the terminal 40 of the information of the article tag 30 that is read.

In the case where the position tag 20 and the article tag 30 are the same type of identifier, a common reader may be used for the position tag reader 22 and the article tag reader 32; and both the position tag 20 and the article tag 30 may be read using one reader.

The terminal 40 includes a communicator 41, an inputter 42, a displayer 43, memory 44, and a processor 45. The terminal 40 is, for example, a smart device such as a smartphone, a tablet, etc.

The communicator 41 includes, for example, an antenna connected to a communication line, an interface connected to another communication device, etc. By the communicator 41, the wireless communication of the information between the beacon 10, the position tag reader 22, and the article tag reader 32 is performed; and the acquisition of the information is performed by the terminal 40.

In other words, the information that is transmitted from the beacon 10 is acquired directly by the terminal 40. The information transmitted from the position tag 20 and the identification information included in the article tag 30 are acquired indirectly by the terminal 40 via each reader.

Signals are transmitted by a common wireless communication standard to the terminal 40 from the beacon 10, the position tag reader 22, and the article tag reader 32. For example, Bluetooth (registered trademark) and/or Bluetooth Low Energy (registered trademark) are used as the communication standard.

The inputter 42 is configured to input information to the terminal 40. The inputter 42 is a touch panel, a microphone (a voice input), a keyboard, etc.

The displayer 43 displays the screen of applications, etc., to the worker. The displayer 43 is a monitor, a touch panel, etc.

An application for operating the terminal 40 is stored in the memory 44. For example, the memory 44 is configured from RAM, ROM, etc.

The processor 45 controls the operations of each part of the terminal 40 and executes the applications on the terminal 40. The processor 45 is a CPU.

The memory part 50 is, for example, a file server and/or a network hard disk. The memory part 50 includes a position information database 51 and an article information database 52. Position information that relates to the locations where the beacon 10 and the position tag 20 are mounted are stored in the position information database 51. The information of the article G to which the article tag 30 is attached is stored in the article information database 52. The terminal 40 can access each database of the memory part 50 by wireless communication and can store and retrieve the information.

A control method of the article in which the control system 100 according to the embodiment is used will now be described with reference to FIG. 2.

Figure 2:
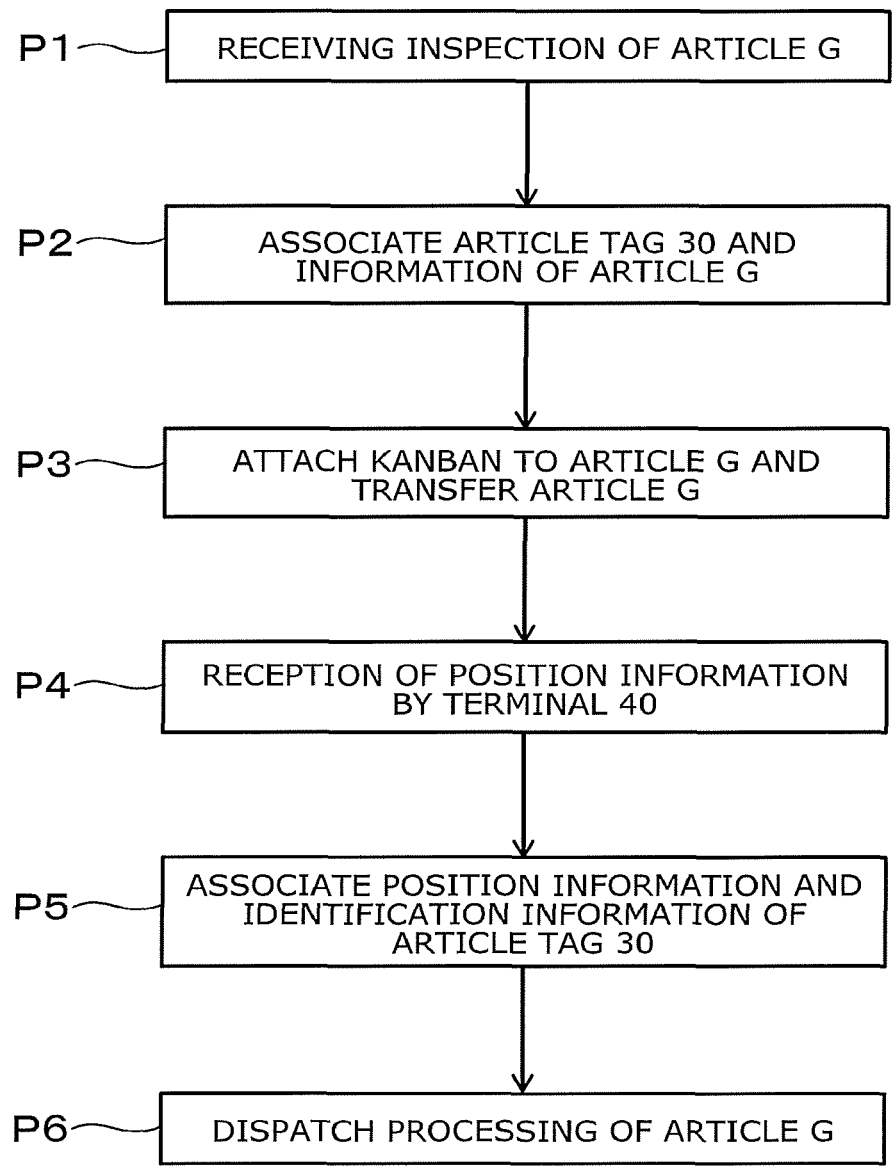
FIG. 2 is a flowchart illustrating the control method of the article in which the control system according to the embodiment is used.

FIG. 2 is a flowchart illustrating the control method of the article in which the control system 100 according to the embodiment is used.

In a process P1, the receiving inspection of the article G is performed. The worker confirms the information listed on the article slip and the information listed on the kanban and selects the articles corresponding to each kanban. For example, the order number, the name of the article, the product number of the article, the lot size, the delivery date, the delivery quantity, etc., are listed on the article slip. Information that relates to the order such as the name of the article, the drawing number, the quantity, the lead time, etc., are listed on the kanban. The article tag 30 accompanies the kanban.

In a process P2, the worker reads the article tag 30 of the kanban using the article tag reader 32 and transmits the read information to the terminal 40. The worker inputs the information listed on the article slip to the terminal 40 using the inputter 42.

For example, the worker inputs the information listed on the article slip to the terminal 40 by operating keys and/or a touch panel of the terminal 40 as the inputter 42. Or, the worker may input the information to the terminal 40 by reading aloud the information listed on the article slip into a microphone of the terminal 40 as the inputter 42.

Thereby, the unique identification information of the article tag 30 and the information of the article slip input to the terminal 40 are associated in the terminal 40. The terminal 40 transmits this information to the memory part 50. Thereby, the information of the article G corresponding to the identification information of the article tag 30 is stored in the article information database 52.

In a process P3, the worker attaches the kanban to the article G and transfers the article G to the prescribed storage location inside the warehouse. At least one of the beacon 10 or the position tag 20 is mounted at the storage location or the vicinity of the storage location.

In a process P4, the worker uses the terminal 40 to receive the position information transmitted from the beacon 10 or the position tag 20. In the case where signals are received from both the beacon 10 and the position tag 20, the worker can select the position information to be used.

In a process P5, the worker associates the received position information and the identification information of the article tag 30 attached to the article G in the terminal 40. The terminal 40 transmits the result to the memory part 50. Thereby, the designated position information and the identification information of the article tag 30 are associated and stored in the memory part 50.

In the process P4, even in the case where the position information is received by the terminal 40, it is also possible to input position information that is listed at each location inside the work site to the terminal 40 using the inputter 42. For example, a character string that indicates the position information is displayed inside the work site. The worker performs voice input to the terminal 40 by reading aloud the character string. In the process P5, the voice-input position information is associated with the identification information of the article tag 30.

Figure 3A:
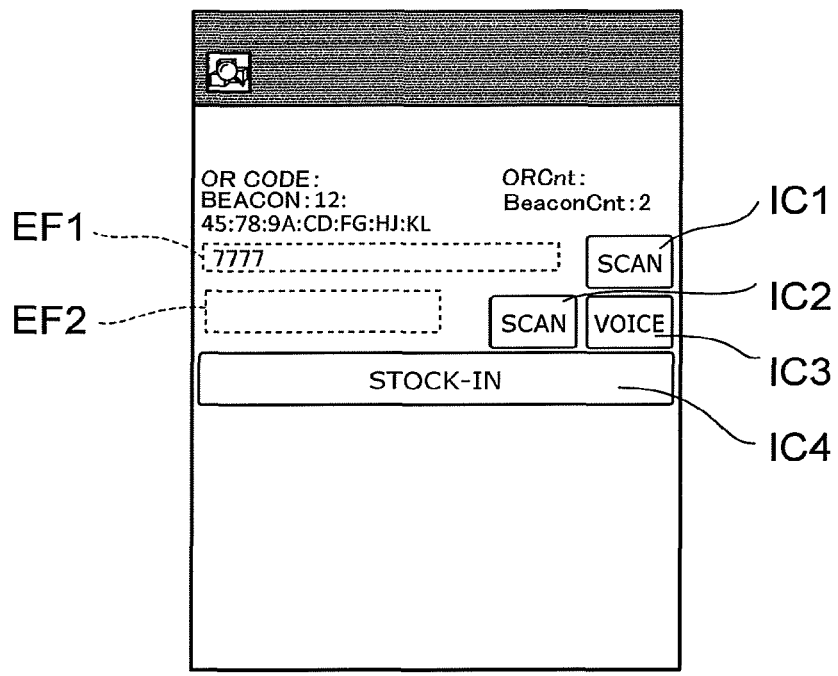
FIG. 3A and FIG. 3B are schematic views illustrating examples of screens displayed on the displayer of the terminal.
Figure 3B:
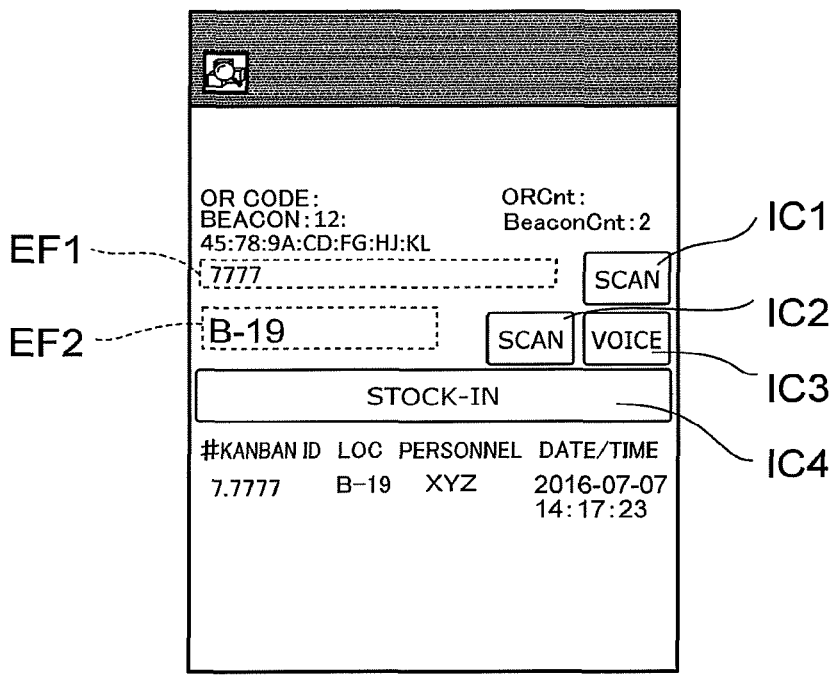

FIG. 3A and FIG. 3B are schematic views illustrating examples of screens displayed on the displayer 43 of the terminal 40.

The ID of the article tag 30 is input to an input field EF1. For example, the article tag reader 32 and the terminal 40 are connected by wireless communication; and "scan" of an icon IC1 is pressed (tapped). By reading the article tag 30 using the article tag reader 32, the ID of the article tag 30 is input automatically to the input field EF1.

The position information is input to an input field EF2. For example, the position tag reader 22 and the terminal 40 are connected by wireless communication; and "scan" of an icon IC2 is pressed. By reading the position tag 20 using the position tag reader 22, the position information of the position tag 20 is input automatically to the input field EF2. Or, "voice" of an icon IC3 may be pressed. In such a case, the position information displayed inside the work site can be input into the input field EF2 by reading aloud the position information displayed inside the work site. For example, the icon IC3 is pressed in the state illustrated in FIG. 3A and a voice (e.g., "bee-nineteen") that corresponds to "B-19" is spoken toward the terminal 40. Thereby, as illustrated in FIG. 3B, the position information is input to the input field EF2. By pressing "store" of an icon IC4 in this state, the association of the position information and the ID of the article tag 30 is performed.

Or, when the terminal 40 receives the radio signal transmitted from the beacon 10, the ID of the beacon 10 is displayed on the displayer 43 of the terminal 40. In the example illustrated in FIG. 3A, the ID of the beacon 10 of "12:45:78:9A:CD:FG:HJ:KL" is displayed. In this state, the ID of the article tag 30 and the position information corresponding to the ID of the beacon 10 are associated by pressing the icon IC4 without inputting anything to the input field EF2.

In the case where the terminal 40 receives signals from multiple beacons 10, the ID of the beacon 10 most proximal to the terminal 40 is displayed.

The case is described above where the icons on the screen displayed on the displayer 43, etc., are operated by hand. However, it is also possible to operate the terminal 40 by voice. In the screen illustrated in FIG. 3A, the function of the voice input is initiated by, for example, saying "location input" to the terminal 40. Continuously, the position information is input to the input field EF2 by reading aloud the position information.

Thereby, the article G is stored in the prescribed location. The association of the designated position information and the identification information of the article tag 30 attached to the article G is stored in the memory part 50. The worker can access the memory part 50 and can confirm the position information of the article G.

Subsequently, the stock-out processing of a process P6 is performed in the case where the stored article G is taken out from the storage location in production, etc. In the process P6, the worker reads the article tag 30 accompanying the kanban of the article G using the article tag reader 32 and transmits the information to the terminal 40. Sequentially, in the terminal 40, the dispatch registration of the article G is performed; and the result is transmitted to the article information database 52.

Effects of using the control system 100 of the embodiment will now be described with reference to FIG. 4.

Figure 4:
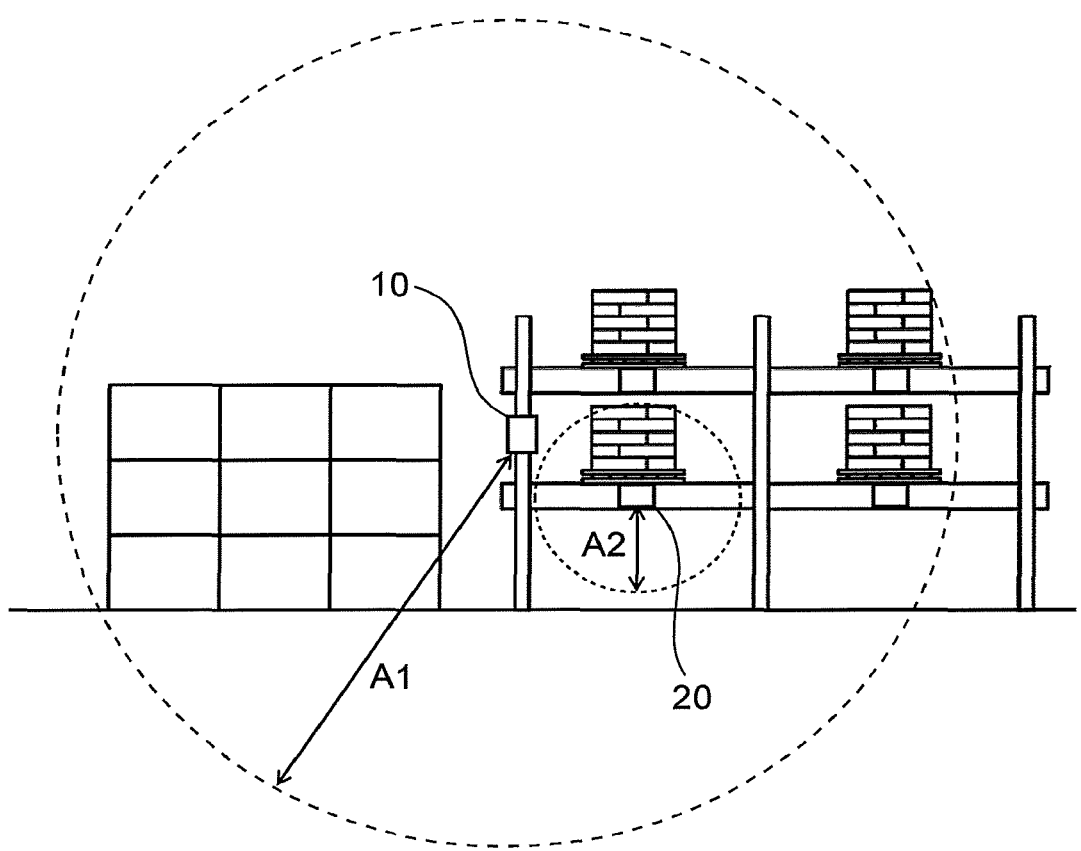
FIG. 4 is a schematic view illustrating an example of the storage location of the article.

FIG. 4 is a schematic view illustrating an example of the storage location of the article.

The left side of FIG. 4 illustrates a rack-less placement state in which the articles are stacked on the floor. The right side of FIG. 4 illustrates the state in which the articles are stored on shelves.

For example, the position tags 20 are attached to the shelves illustrated on the right side of FIG. 4 for each row, each bay, and each level. In the case where the articles are stored on the shelves, the position information can be acquired by reading the position tag 20 mounted at the storage location.

However, for the rack-less placement location of the articles, if the position tag 20 is attached to the floor, there is a possibility that the position tag 20 may be undesirably trodden on or damaged by a human, a forklift, etc. Because the radio signal range of the position tag 20 is not wide, it is also difficult to read by mounting to the ceiling. Accordingly, conventionally, when the articles are placed in a rack-less placement zone, for example, the position information of the article is registered manually in the prescribed terminal; and the operational efficiency is poor.

In the control system 100, the beacon 10 is mounted to a shelf, etc., proximal to the rack-less placement zone as illustrated in FIG. 4. A range A1 that is reached by the radio signal of the beacon 10 is wider than a range A2 reached by the radio signal of the position tag 20. Therefore, even in the case where the beacon 10 is distal to the rack-less placement zone, the terminal 40 can receive the signal that is transmitted from the beacon 10. When the rack-less placement of the article is performed, the position information of the beacon 10 is received at the rack-less placement zone; and it is possible to associate the position information of the beacon 10 and the identification information of the article tag 30 attached to the article.

By using the beacon having the wide radio signal range, it is possible to receive the position information at the rack-less placement zone and register the position information. Accordingly, it is unnecessary to input the position information manually; and it is possible to improve the operational efficiency.

It is also possible to control the position information of all of the articles stored at the rack-less placement zone and the shelves by using only the beacon. However, because the radio signal range of the beacon is wide, the range of the position information also widens. If the range of the position information widens, there is a possibility that the time necessary to search for the stored article may lengthen.

As illustrated in FIG. 4, in addition to the beacon 10, it is desirable to mount the position tag 20 having a narrower radio signal range than the beacon 10. Thereby, in the case where the article is stored at a location where it is possible to mount the position tag 20 such as a shelf, etc., it is possible to associate more detailed position information with the identification information of the article tag 30.

In other words, by selectively using two types of transmitters having different ranges of the radio signals according to the conditions of the location where the article is stored, it becomes easy to associate the position information with the article tag at the rack-less placement zone, etc. Additionally, it is possible to associate more detailed position information with the article tag at the shelf, etc.

In the case where a small drawer, storage box, or the like is provided at the shelf and small parts are stored inside the small drawer, storage box, etc., the control system 100 may include a transmitter having a narrower radio signal range than the position tag 20. Or, the control system 100 may further include an identifier such as a barcode or the like that does not emit a radio signal.

By using such a configuration, it is possible to register and associate more detailed position information with the article tag 30 attached to the small size article.

In the control system 100 according to the embodiment, all of the signals transmitted from the beacon 10, the position tag reader 22, and the article tag reader 32 are received by the terminal 40 by using a common communication standard. According to such a configuration, the prescribed application is operated in the terminal 40; and it is possible to associate the identification information of the article tag 30 and the position information signal from each transmitter by receiving this information. As a result, the operational efficiency can be improved further.

Although the beacon 10 and the position tag 20 are mounted at different positions in the example illustrated in FIG. 4, the beacon 10 may be mounted at the same position as the position tag 20 as long as the radio signal reaches the rack-less placement zone.

Depending on the conditions of the work site, there also may be cases where there are no locations where the beacon 10 can be mounted at the storage location vicinity of the article. There also may be cases where the worker cannot operate the terminal 40 because the hands are occupied for transferring the article or the hands are unclean.

For such a case, in the control system 100, the terminal 40 is configured to acquire position information by using a voice input. In the case where there is no location to mount the beacon 10, for example, position information that is represented using a character string is attached to the floor of each storage location, etc. The worker can input the position information to the input field EF2 illustrated in FIG. 3 by reading aloud, to the terminal 40, the position information attached to the floor.

If the position information is attached to the storage location, there also may be cases where the attached position information is input even though the storage location is inside the radio signal range A1 of the beacon 10; and more detailed position information is associated with the identification information of the article tag 30.

In the control system 100, the ID of the beacon 10 is displayed by the displayer 43 when the terminal 40 automatically receives the radio signal from the beacon 10. At this time, the terminal 40 is further configured to acquire the position information by using the voice of the worker.

In other words, the terminal 40 is configured to acquire the position information by using another method while causing the displayer 43 to display the position information acquired from the beacon 10. As a result, it is possible for the worker to use appropriate method to register the position information depending on the condition of each work site and/or storage location.

The numbers of the beacons 10, the position tags 20, and the article tags 30 included in the control system 100 are arbitrary. These numbers can be adjusted appropriately according to the number of the articles that are stored, the size of the warehouse where the articles are stored, the layout of the rack-less placement zones and the shelves, etc.

The control system 100 may be configured so that the terminal 40 can execute each processing from when the article is stored in the warehouse to when the dispatch processing is performed.

FIG. 5A to FIG. 5D are schematic views illustrating examples of control screens displayed by the displayer 43 of the terminal 40.

Figure 5A:
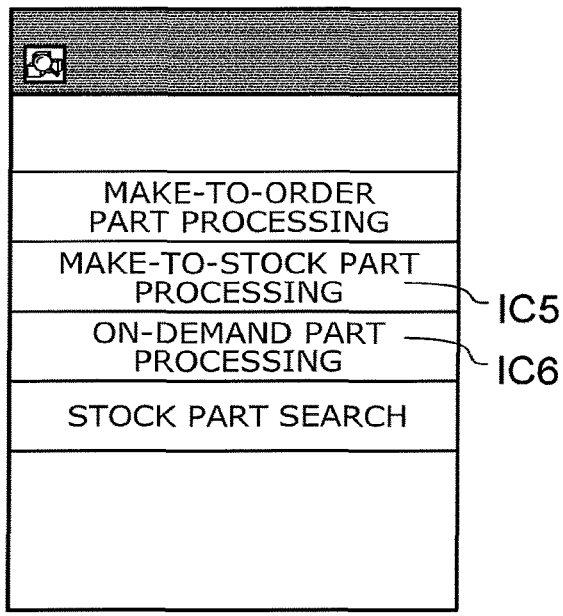
FIG. 5A to FIG. 5D are schematic views illustrating examples of control screens displayed on the displayer of the terminal.

As illustrated in FIG. 5A, for example, icons that show the categories of the various processing for the stored articles are displayed by the displayer 43 of the terminal 40. When any of these icons are pressed, the displayer 43 displays a screen showing the specific processing inside each category.

Figure 5B:
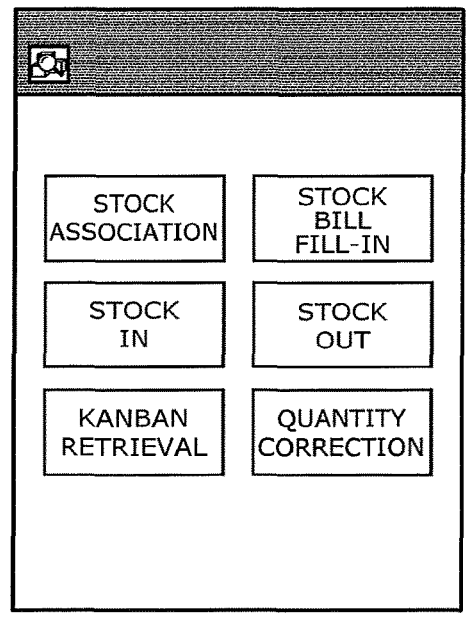

For example, by pressing an icon IC5 "make-to-stock part processing" illustrated in FIG. 5A, more specific processing can be selected from processing categorized as make-to-stock part processing such as that illustrated in FIG. 5B. Similarly, by pressing an icon IC6 "on-demand part processing" illustrated in FIG. 5A, more specific processing can be selected from the processing categorized as request part processing such as that illustrated in FIG. 5C.

Figure 5C:
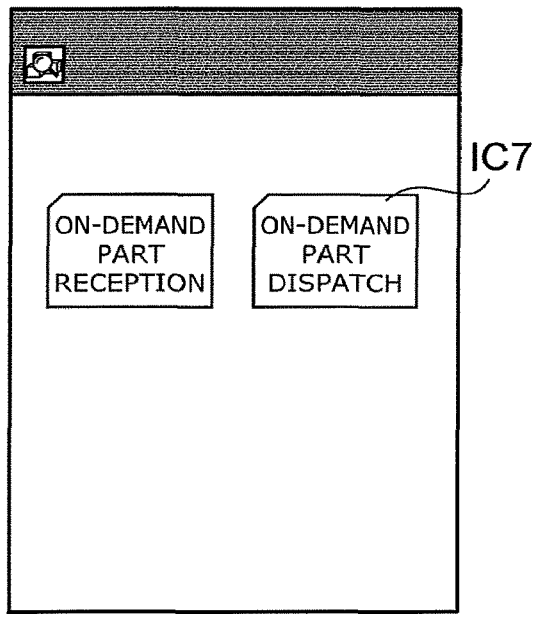
Figure 5D:
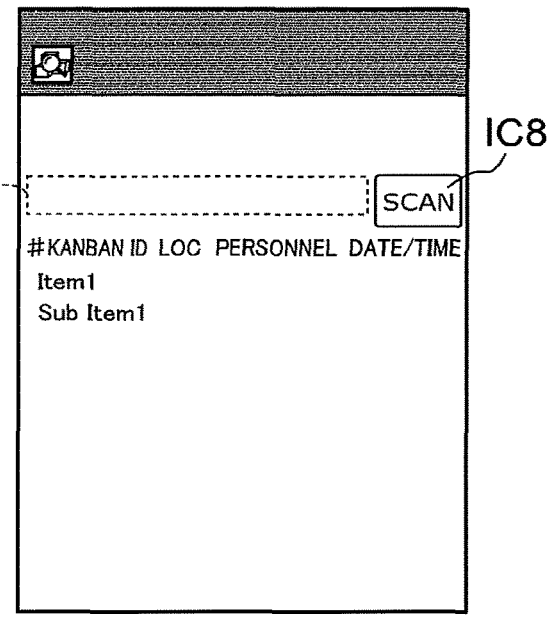

For example, by pressing an icon IC7 "on-demand part dispatch" at the screen illustrated in FIG. 5C, the screen illustrated in FIG. 5D is displayed. The screen requests the worker to input, into an input field EF3, information for designating the article for the on-demand part dispatch. The worker performs the processing of the on-demand part dispatch by inputting the information into the input field EF3 by using the inputter 42. Or, an icon IC8 "scan" may be pressed at the screen illustrated in FIG. 5D. In such a case, it is possible to input the information to the input field EF3 by scanning the article tag 30 using the article tag reader 32.

It is also possible to perform the operation described above by voice input to the inputter 42 of the terminal 40. For example, by speaking a voice corresponding to "make-to-stock part processing" into the terminal 40 at the screen illustrated in FIG. 5A, the screen switches to the screen illustrated in FIG. 5B. Continuing, by speaking a voice corresponding to "on-demand part processing," the screen switches to the screen illustrated in FIG. 5C.

The article is stored in the warehouse; and the article tag 30 and the position information of the beacon 10 or the position tag 20 are associated. Subsequently, using the terminal 40, the position of the article stored inside the warehouse can be visualized (by mapping) and displayed by the displayer 43. This aspect is described with reference to FIG. 6 and FIG. 7.

Figure 6A:
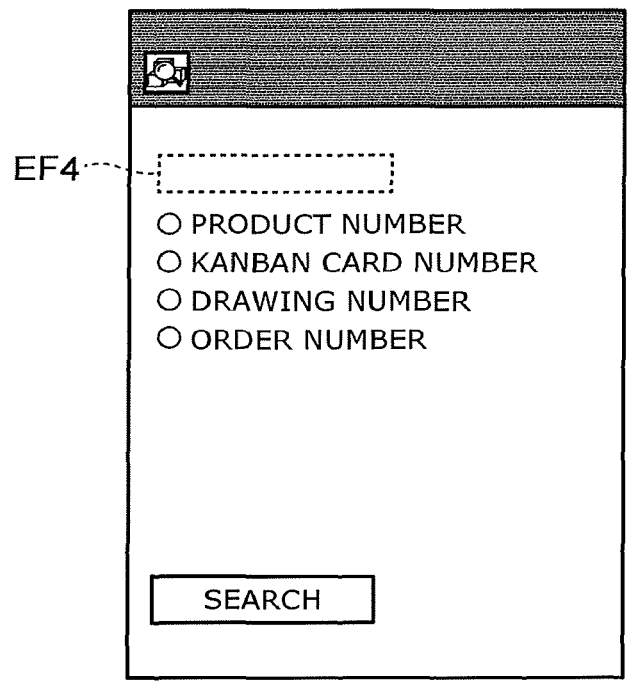
FIG. 6A, FIG. 6B, and FIG. 7 are schematic views illustrating examples of screens displayed on the displayer of the terminal.
Figure 6B:
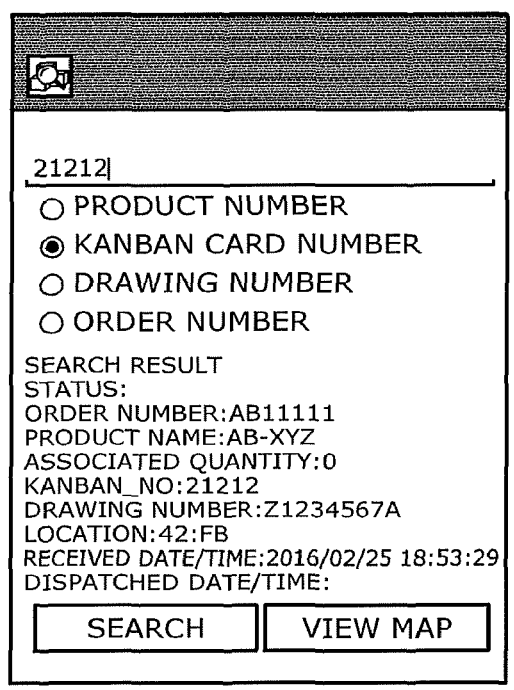
Figure 7:
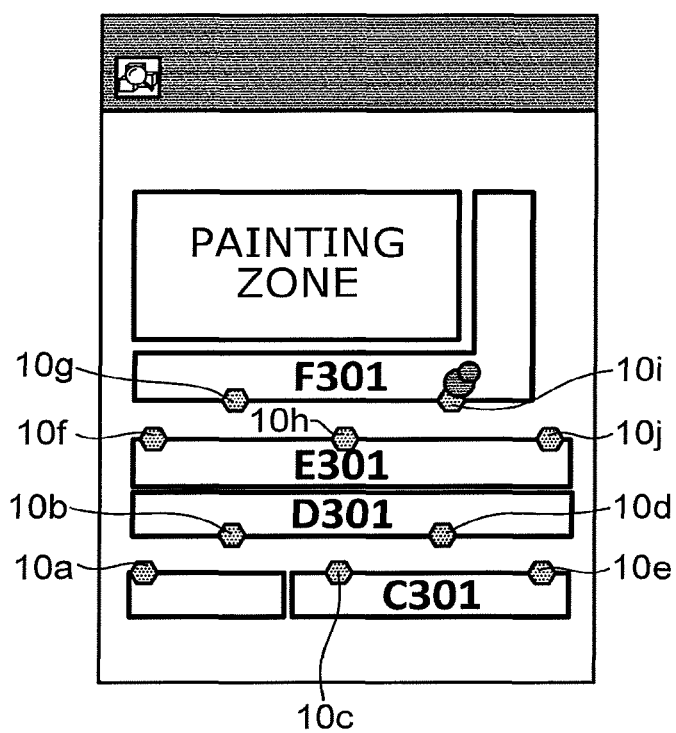

FIG. 6A, FIG. 6B, and FIG. 7 are schematic views illustrating examples of screens displayed by the displayer 43 of the terminal 40.

As illustrated in FIG. 6A, the terminal 40 requests the worker to input the information for designating the article of interest. The worker selects the type of the information, inputs the information to an input field EF4, and performs a search. The input to the input field EF4 is performed using the keys and/or the touch panel of the terminal 40. The input to the input field EF4 may be performed by a voice by using a microphone. The terminal 40 accesses the article information database 52 of the memory part 50 and searches for the article matching the input conditions.

In the case where the article matching the conditions is found, the detailed information of the article is displayed on the screen as illustrated in FIG. 6B. When the worker selects "view map" in this state, the position information is visualized and displayed on a map as illustrated in FIG. 7.

The positions of multiple beacons 10a to 10i are displayed on the map of FIG. 7. The displayer 43 displays the position of the beacon associated with the identification information of the article to be discriminable from the other beacons. In the example of FIG. 7, it is shown that the article is stored within the radio signal range of the beacon 10i. The worker can scroll, enlarge or reduce the map displayed on the screen as necessary.

In the control system 100, the position information database 51 and the article information database 52 are stored in the memory part 50. Accordingly, it is also possible to access the memory part 50 and view the article information from a device other than the terminal 40.

Figure 9:
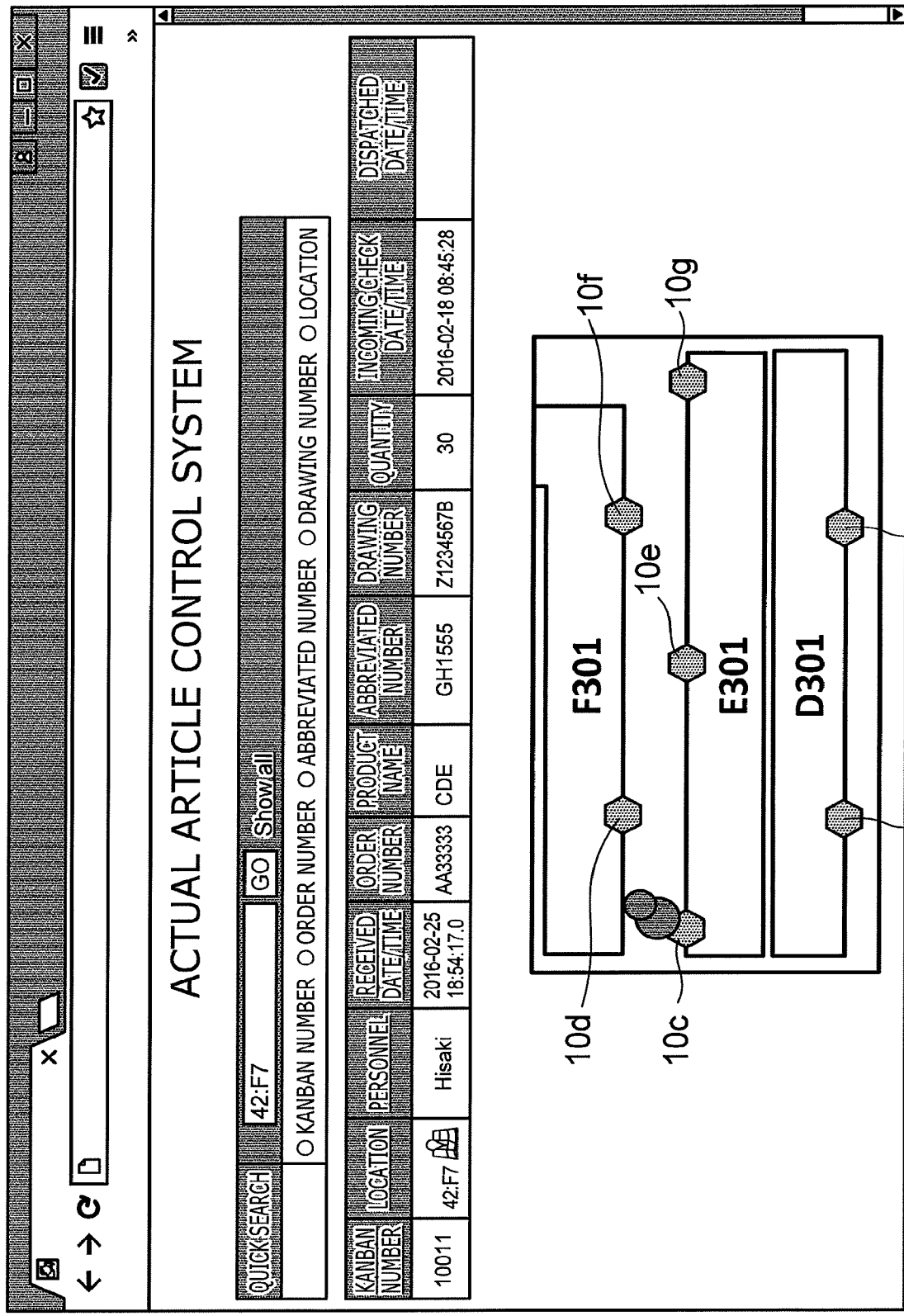

FIG. 8 and FIG. 9 are schematic views illustrating examples of screens displayed by another displayer.

FIG. 8 illustrates an example of the case where the memory part 50 is accessed from a personal computer, and the article information and the position information are displayed on the monitor of the personal computer.

FIG. 9 illustrates an example of the case where the position information that is associated with the selected article is displayed.

When accessing the memory part 50 from the personal computer, for example, as illustrated in FIG. 8, the token number, the storage location, the received date and time, the order number, the product name, etc., of the registered article are displayed. When the type of the information used to search is selected and the information is input to an input field EF5, the search result is displayed on the screen.

When the article displayed on the screen of the search result is selected, the position information that is associated with the article tag of the article is visualized and displayed on the map on the screen as illustrated in FIG. 9. In the screen illustrated in FIG. 9, among the multiple beacons 10a to 10g, it is illustrated that the article to be searched is stored within the radio signal range of the beacon 10c.

As described above, in the control system 100 according to the embodiment, the position information associated with the article tag of the designated article can be visualized and displayed. Therefore, it is possible for the worker to smoothly ascertain the location of the article; and the operational efficiency can be improved.

A desirable arrangement in the case where the multiple beacons are mounted at the storage location of the article will now be described with reference to FIG. 10.

Figure 10:
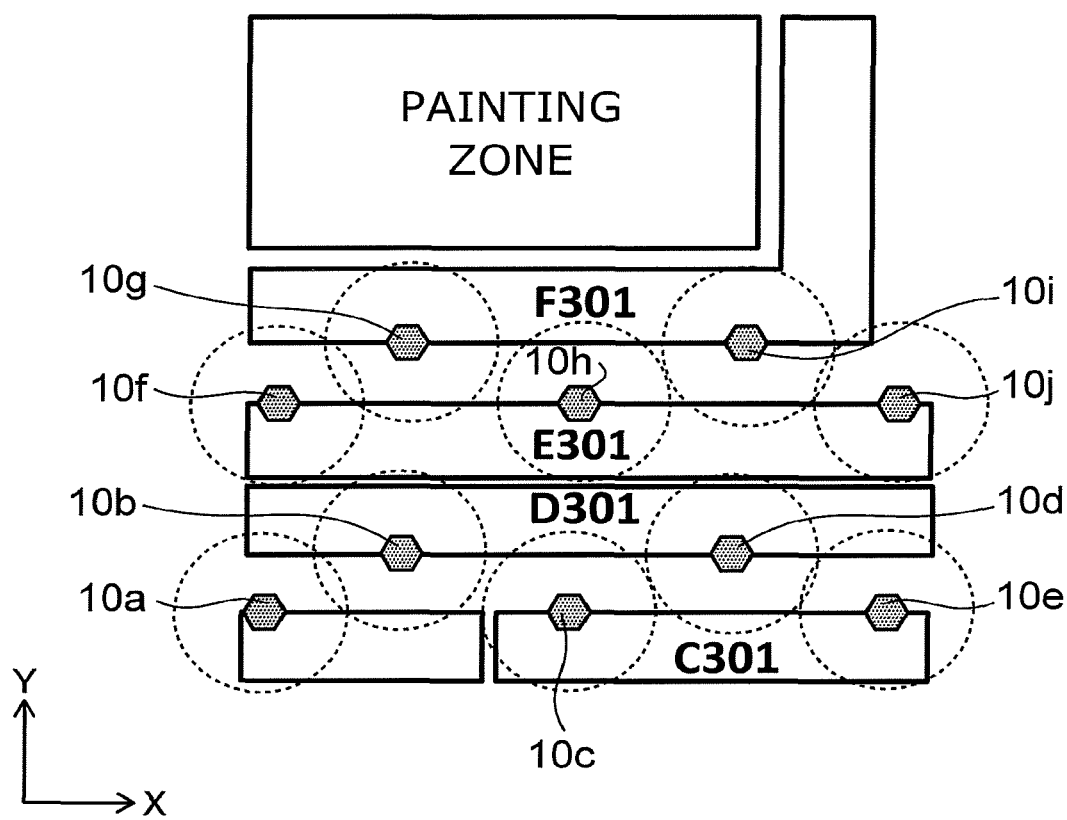
FIG. 10 is a schematic view illustrating the storage location of the article.

FIG. 10 is a schematic view illustrating the storage location of the article.

The broken lines in FIG. 10 show the radio signal ranges of each of the beacons.

At the storage location illustrated in FIG. 10, a shelf C301, a shelf D301, a shelf E301, and a part of a shelf F301 are provided along an X-direction (a first direction). These shelves oppose each other in a Y-direction (a second direction).

In the case where the shelves are thus arranged, it is desirable for the positions in the X-direction of the beacon mounted to the shelves adjacent to each other in the Y-direction to be different. In one specific example, the positions in the X-direction of the beacons 10c and 10e mounted to the shelf C301 (a first storer) are not the same as the positions in the X-direction of the beacons 10b and 10d mounted to the shelf D301 (a second storer), and are shifted in the X-direction.

As described above, the radio signal ranges of the beacons are wider than the radio signal ranges of the RFIDs, etc. Accordingly, the shelf that is adjacent in the Y-direction to the shelf to which the beacon is mounted may be within the range of the radio signal. In such a case, if the multiple beacons are arranged in lines in the X-direction and the Y-direction, the overlap of the radio signal ranges of the beacons becomes large. This causes an unnecessary increase of the number of beacons.

In the example illustrated in FIG. 10, the positions in the X-direction are different between the beacons mounted to the shelves adjacent to each other in the Y-direction. According to this arrangement, the overlap of the radio signal ranges of the beacons can be small. As a result, it is possible to reduce the necessary number of beacons.

The radio signal range of the beacon 10 is wider than that of the position tag 20. Therefore, the range that must be searched is wider in the case where the position information transmitted from the beacon 10 is associated with the article tag 30 of the searched article.

It is also possible to use the control system 100 to designate a more detailed position of the article tag 30 in the state in which the terminal 40 is connected to the article tag reader 32. This aspect is described with reference to FIG. 9 and FIG. 11.

Figure 11A:
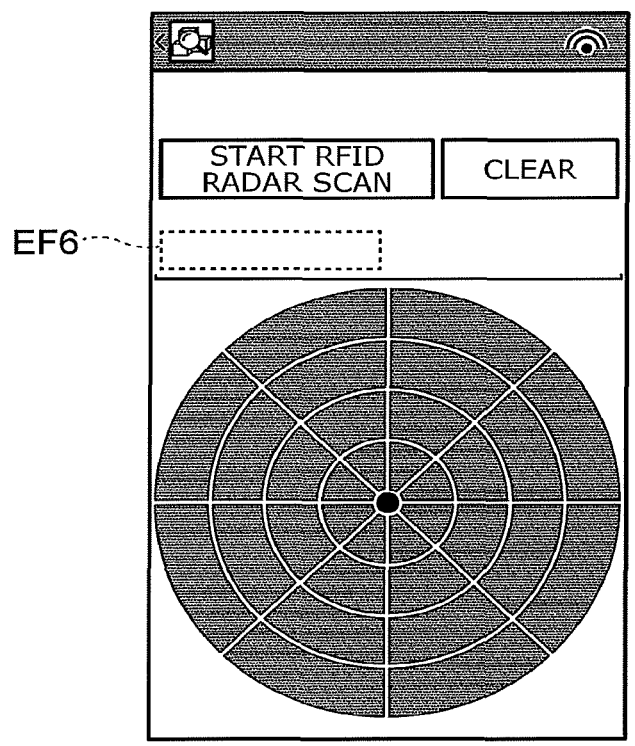
FIG. 11A and FIG. 11B are schematic views illustrating examples of screens displayed on the displayer of the terminal.
Figure 11B:
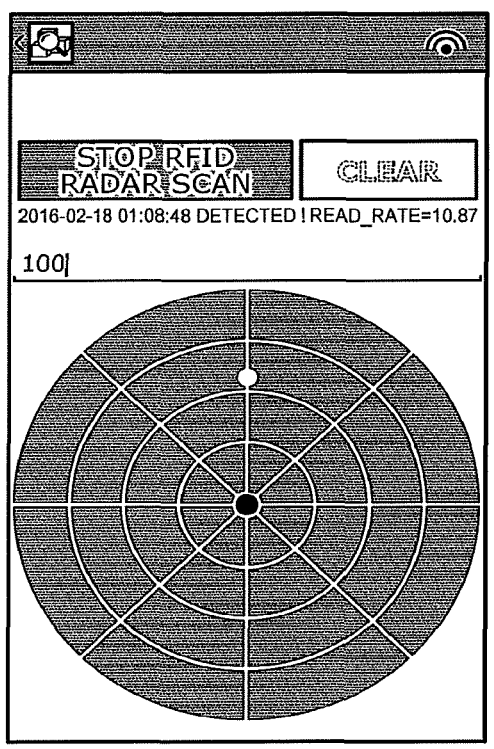

FIG. 11A and FIG. 11B are schematic views illustrating examples of screens displayed by the displayer 43 of the terminal 40.

In FIG. 11A, the black dot at the center of the screen shows the position of the worker holding the article tag reader 32 and the terminal 40. Here, the case where the article tag 30 is a passive RFID tag is described as an example.

In the screen illustrated in FIG. 11A, the identification number of the article tag 30 to be searched is input to an input field EF6. When the input is completed, the radio signal from the article tag reader 32 is transmitted. The article tag 30 transmits the identification information when the article tag 30 receives the radio signal from the article tag reader 32.

The article tag reader 32 transmits, to the terminal 40, the identification information transmitted from the article tag 30. The terminal 40 discriminates whether or not the identification information that is transmitted matches the identification information of the article tag to be searched. In the case where the identification information matches, the terminal 40 displays roughly the position of the article tag 30 on the screen as illustrated by the white circle of FIG. 11B.

Thus, according to the control system 100 according to the embodiment, the position information that is associated with the article tag 30 can be visualized and displayed. Further, it is possible to designate the detailed position of the article tag 30 of the position information by using the terminal 40 and the article tag reader 32. Therefore, it is possible to improve the operational efficiency of the worker even more.

It is desirable for the outreach distance of the radio signal emitted from the article tag reader 32 to be, for example, in a narrow range of 1 m or less. It is desirable for the signal emitted from the article tag reader 32 to be directional. Thereby, the radio signal from the article tag reader 32 is transmitted only in a limited region. Therefore, when the radio signal that is transmitted from the article tag reader 32 is received and the radio signal is transmitted from the article tag 30, it is easier to narrow down the location of the article tag 30. As a result, it is possible to find the article to which the article tag 30 is attached more easily.

(Modification)

The case is described in the embodiment according to the example described above where signals containing the position information from the beacon 10 and the position tag 20 are transmitted. However, the invention according to the embodiment is not limited thereto.

For example, the beacon 10 and the position tag 20 may transmit signals that contain only the unique identification information without containing the position information. In such a case, the memory part 50 stores, in the position information database 51, the position information corresponding to the identification information of each of the beacon 10 and the position tag 20.

The terminal 40 acquires the first identification information of the article tag 30 and acquires the second identification information of the position tag 20 or the beacon 10. Then, the terminal 40 associates the first identification information and the second identification information. The terminal 40 stores the result in the memory part 50. The position information that corresponds to the second identification information is stored in the position information database 51 of the memory part 50. Therefore, the first identification information and the position information also are associated by associating the first identification information and the second identification information.

Thus, in the control system according to the embodiment, it is possible to employ various methods for associating the position information and the identification information of the article tag 30.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A control system of an article, the control system comprising:
   a first transmitter having a first radio signal range, being mounted at a first location, and transmitting first position information relating to the first location;
   a second transmitter having a second radio signal range, being mounted at a second location, and transmitting second position information relating to the second location, the second radio signal range being narrower than the first radio signal range;
   an acquirer acquiring at least one of the first position information and the second position information;

a first identifier including first identification information and being attached to the article; and a memory part, the first identification information being associated with the first position information or the second position information and stored in the memory part, wherein the acquirer is configured to associate the first identification information with at least one of the first position information and the second position information based on the acquired at least one of first and second position information and the association stored in said memory part, thereby to identify the location of the article as being within the range of at least one of the first transmitter or the second transmitter based on the acquired first or second position information and the association stored in the memory part.

2. The control system according to claim 1, further comprising:

a first reader reading the second position information and transmitting the second position information to the acquirer; and a second reader reading the first identification information and transmitting the first identification information to the acquirer, the transmitting to the acquirer from the first transmitter, the first reader, and the second reader being performed using a common wireless communication standard.

3. The control system according to claim 2, wherein
the first transmitter is a beacon,
the second transmitter is a RFID tag,
the first reader is a RFID reader, and
the wireless communication standard is Bluetooth (registered trademark).

4. The control system according to claim 1, further comprising a displayer visualizing and displaying the first position information or the second position information associated with the first identification information.

5. The control system according to claim 1, further comprising a third transmitter having the first radio signal range, being mounted at a third location, and transmitting third position information relating to the third location, the first transmitter being mounted to a first storer provided along a first direction, the third transmitter being mounted to a second storer provided along the first direction, the second storer opposing the first storer in a second direction perpendicular to the first direction, a position in the first direction of the first transmitter being different from a position in the first direction of the second transmitter.

6. A control system of an article, the control system comprising:

a first transmitter having a first radio signal range, being mounted at a first location, and transmitting first identification information;

a second transmitter having a second radio signal range, being mounted at a second location, and transmitting second identification information, the second radio signal range being narrower than the first radio signal range;

an acquirer acquiring at least one of the first identification information and the second identification information;

a first identifier including third identification information and being attached to the article; and a memory part, first position information and second position information being stored in the memory part, the first position information relating to the first location and corresponding to the first identification information, the second position information relating to the second location and corresponding to the second identification information, the third identification information being associated with the first identification information or the second identification information and stored in the memory part, wherein the acquirer is configured to associate the third identification information with at least one of the first position information and the second position information based on the acquired at least one of first and second position information and the association stored in said memory part, thereby to identify the location of the article as being within the range of at least one of the first transmitter or the second transmitter based on the acquired first or second position information and the association stored in the memory part.

7. A control system of an article stored inside a warehouse, the control system comprising:

a beacon mounted on a prescribed location inside the warehouse, the beacon transmitting first position information relating to the prescribed location;

an identifier attached to the article, the identifier including identification information unique to the article, a reader reading the identification information;

an acquirer acquiring the first position information transmitted from the beacon, the identification information read by the reader and second position information input as a voice input;

a displayer displaying the first position information and the identification information acquired by the acquirer; and a memory part storing the identification information associated with selected one of the first position information and the second position information, wherein the acquirer is configured to acquire the second position information during the displayer displaying the first position information acquired therein and the identification information.

* * * * *